United States Patent [19]

Valimont et al.

[11] 4,367,108
[45] Jan. 4, 1983

[54] MANUFACTURE OF LAMINATED ASSEMBLIES

[75] Inventors: James L. Valimont, Cheswick, Pa.; George W. Shoop, Seminole, Fla.

[73] Assignee: PPG Industries, Inc., Pittsburgh, Pa.

[21] Appl. No.: 154,210

[22] Filed: May 29, 1980

[51] Int. Cl.³ .................. B29C 27/06; B32B 31/20; C03C 27/12
[52] U.S. Cl. .................. 156/104; 156/105; 156/106; 156/107; 156/286; 156/308.2; 156/308.4; 156/382; 156/497; 156/583.1
[58] Field of Search ............... 156/104, 105, 106, 107, 156/286, 308.2, 382, 497, 583.1, 308.4, 309.6; 219/203

[56] References Cited

U.S. PATENT DOCUMENTS

| | | | |
|---|---|---|---|
| 1,914,392 | 6/1933 | Worrall | 100/90 |
| 2,673,822 | 3/1954 | Dennison et al. | 156/104 |
| 2,714,567 | 8/1955 | Cravener | 156/580 |
| 2,831,792 | 4/1958 | Gaiser | 156/104 |
| 2,837,453 | 6/1958 | Englehart | 156/104 |
| 2,948,645 | 8/1960 | Keim | 156/104 |
| 2,992,953 | 7/1961 | Talburtt | 156/104 |
| 3,074,466 | 1/1963 | Little | 156/286 |
| 3,074,838 | 1/1963 | Little | 156/382 |
| 3,100,173 | 8/1963 | Boicey et al. | 156/105 |
| 3,146,148 | 8/1964 | Mitchella et al. | 156/382 |
| 3,249,479 | 5/1966 | Boicey | 156/104 |
| 3,873,395 | 3/1975 | Ehrlich | 156/382 |
| 3,879,251 | 4/1975 | Ingham | 156/498 |
| 3,912,542 | 10/1975 | Hirano et al. | 156/104 |
| 3,960,627 | 6/1976 | Halberschmidt et al. | 156/104 |
| 3,964,958 | 6/1976 | Johnston | 156/382 |

FOREIGN PATENT DOCUMENTS 204166 5/1966 Australia .

*Primary Examiner*—Michael G. Wityshyn
*Attorney, Agent, or Firm*—Donald Carl Lepiane; Lee Patch

[57] ABSTRACT

A laminate assembly having rigid sheets about a thermoplastic interlayer has interfacial surfaces evacuated and peripheral edges sealed by applying localized vacuum and heat to only the periphery and marginal edge portions. A flexible heating blanket having marginally embedded heating elements overlies the laminate assembly and is biased theretoward by a flexible channel-shaped ring. The channel-shaped ring establishes a conduit about the periphery of the laminate assembly which is evacuated to remove entrapped air, and the heating element is energized to bond and seal the marginal edge portions of the assembly.

25 Claims, 5 Drawing Figures

U.S. Patent  Jan. 4, 1983  4,367,108
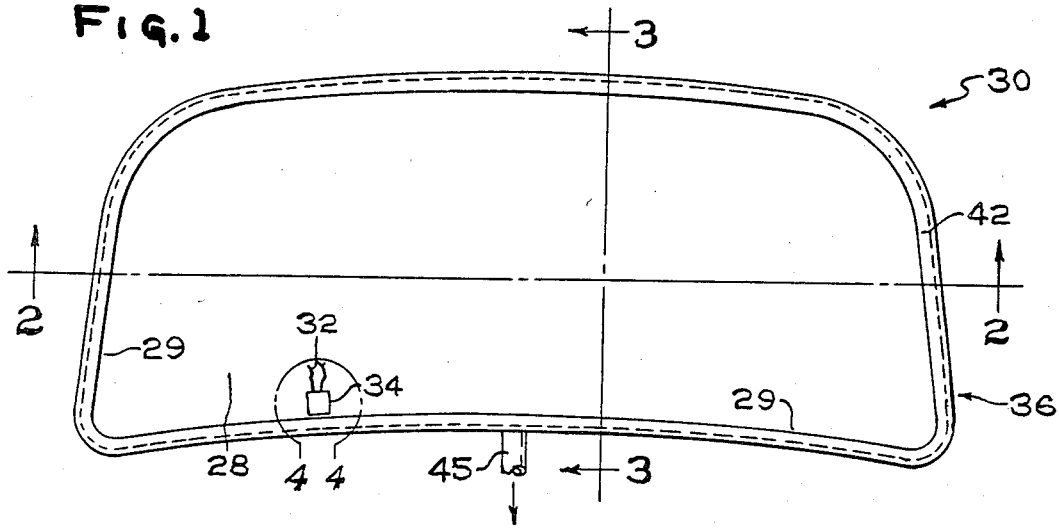
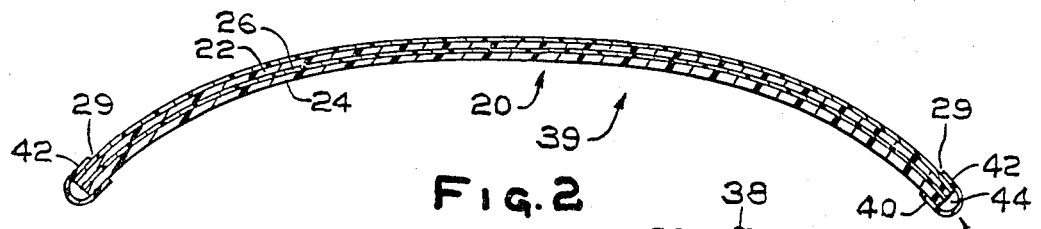
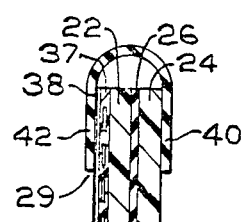
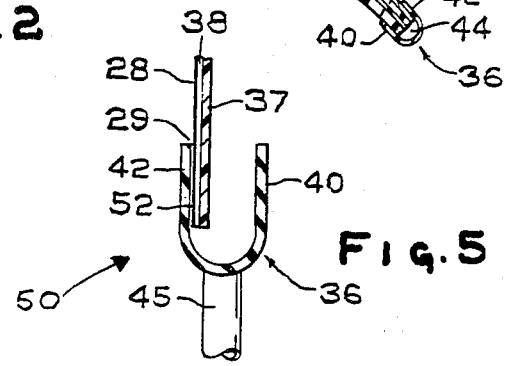
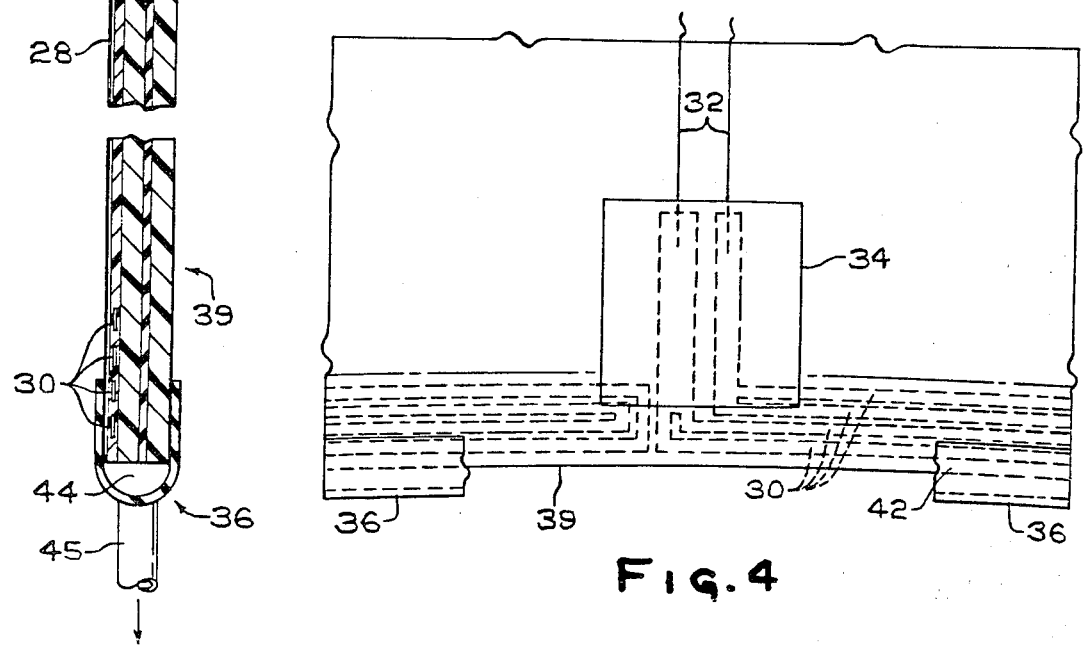

MANUFACTURE OF LAMINATED ASSEMBLIES

FIELD OF THE INVENTION

This invention relates to the manufacture of laminated assemblies and, more particularly, to the preliminary pressing of laminate assemblies comprising two sheets, e.g., glass sheets, about a thermoplastic interlayer.

DISCUSSION OF THE TECHNICAL PROBLEM

In the manufacture of laminated glass assemblies, it is customary to obtain a final seal or bond between the thermoplastic interlayer and glass sheets by the application of high temperature and high pressure, e.g., in an autoclave using a fluid such as oil or air. However, unless air that becomes entrapped between the laminae during their assembly is removed from the interfacial surfaces of the laminate assembly and unless the edges of the laminate assembly are thereafter sealed prior to the autoclave process, air and autoclave fluid will infiltrate between the laminae to deleteriously affect the bonding and optical characteristics of the laminate assembly.

It has been proposed to seal the laminate assembly within an evacuated bag to remove entrapped air from between the laminae, after which the bag and laminate assembly are inserted within the autoclave. Although this technique produces a satisfactory product, it has proven expensive, cumbersome, and time consuming in operation, and delays visual inspection of the laminate assembly until it has been removed from the autoclave and protective bag.

Alternatively, methods have been proposed by which laminate assemblies can be placed within the autoclave in direct contact with the fluid within. Initially, when laminate assemblies were generally flat or gently curved, they were heated and passed through one or more pairs of resilient nipper rolls to bond the opposite surfaces of the interlayer to the glass sheets. This provided a sufficient seal extending substantially over the entire area of the laminate assembly to prevent damage within the autoclave.

However, with the development of more complex curvatures for windshields, the use of nipper rolls has not proven entirely satisfactory. Severe and complex bends are more likely to develop areas of non-uniform pressure upon the surface of the laminate assembly, with resultant air bubbles, breakage, and inconsistent edge sealing.

U.S. Pat. Nos. 2,673,822 to Dennison et al and 2,837,453 to Englehart et al and Australian Pat. No. 204,166 to Roetter et al teach the supporting of a laminate assembly upon a fixed frame having a surface which closely conforms to the shape of the major surface of the laminate assembly in contact therewith. An upper member is lowered atop the laminate assembly to form an enclosure and vacuum is applied therein to remove air entrapped at the interfacial surfaces of the laminae, after which heat is supplied to the marginal edges of the laminate assembly to seal the periphery thereof. While these patents teach systems which may produce satisfactory results, they are limited by their complexity of apparatus and process. Each system employs a fixed table or frame and is limited by the shape of the support surface as to the number of different patterns of laminate assemblies that can be sealed thereon. In production, a change in laminate assembly pattern could require major changes in frame shape, requiring numerous frames and considerable storage area for each. It would be preferred to have a system with greater flexibility for simple changing from one laminate assembly pattern to another.

Other methods by which the laminate assembly can be placed directly within the autoclave use an evacuation ring engaged about the periphery and marginal edges of the laminate assembly to draw entrapped air from the interfacial surfaces thereof. Evacuation rings of this type are taught in U.S. Pat. Nos. 2,948,645 to Keim, 2,992,953 to Talburtt, 3,074,466 and 3,074,838 to Little, 3,100,173 to Boicey et al and 3,249,479 to Boicey. In the above-mentioned patents to Keim, Boicey et al and Boicey, the evacuated laminate assembly is transported with the evacuation ring attached thereto through an oven wherein the entire laminate assembly is heated to a temperature sufficient to bond the thermoplastic interlayer to the adjoining glass sheets prior to autoclaving. A limitation of this system is that it may produce non-uniform heating and therefore non-uniform bonding because the evacuation ring may shield the marginal edge portions of the laminate assembly from the requisite temperature. Further, heating of the entire laminate assembly within an oven results in inefficiency of energy utilization, because only the periphery of the laminate assembly needs to be sealed before autoclaving.

In the patents to Talburtt and Little, the evacuated laminate assembly with the evacuation ring attached is transported directly into the autoclave for a final temperature and pressure treatment. Again, however, the evacuation ring may shield the marginal edge portions of the laminate assembly from the requisite temperature and pressure, thus causing non-uniformity in the bonding between laminae. It would be advantageous to have an apparatus and process for preparing laminate assemblies for autoclaving which avoids the technical difficulties discussed above.

SUMMARY OF THE INVENTION

The present invention relates to a method of and apparatus for preparing a laminate assembly, e.g. for autoclaving, the laminate assembly having two matched, rigid sheets about a thermoplastic interlayer. A heating element is positioned upon a major surface of the laminate assembly at the marginal edges thereof, after which at least a portion of the heating element and only the periphery and marginal edge portions of the laminate assembly are enclosed within a channel shaped member. The channel shaped member establishes a conduit adjacent to and in communication with the interfaces of the assembly while biasing the heating element towards its adjacent marginal edge portions of the laminate assembly. A vacuum is drawn in the conduit to evacuate the interfaces of the laminate assembly, and the heating element is activated to heat the marginal edge portions to seal the periphery of the laminate assembly.

The heating element of the present invention comprises a fluid-impervious blanket which is generally conformable to the peripheral dimensions of the laminate assembly. Heating facilities, e.g., electrically conductive strips, are imbedded within the marginal edge portion of the blanket, and are positioned adjacent the marginal edge portion of the laminate assembly when the blanket is positioned thereon. The blanket preferably is thin, flexible, and heat resistant, and may be formed of a silicone rubber material. Further, the outer major surface of the blanket may be covered with a thin protective sheet, e.g., stainless steel, bonded thereto to improve durability. The heating facilities of the blanket preferably provide a uniform temperature about the marginal edge portions thereof in excess of the bonding temperature of the thermoplastic interlayer.

The channel shaped member of the present invention is endless, flexible, and fluid impervious, and is positioned about the entire periphery of the laminate assembly and at least a portion of the heating element. After the heating blanket is positioned adjacent a major surface of the laminate assembly, the channel shaped member engages the marginal edges of the laminate assembly and heating blanket within opposing channel arms, one channel arm biased against the marginal edge portion of a sheet and the other channel arm biased against the marginal edge portion of the heating blanket, thus holding the heating blanket in position against the laminate assembly. A conduit is formed between the periphery of the laminate assembly and the back wall of the channel shaped member, which, in turn, is evacuated to draw air from the interfaces of the laminate assembly. While the interfaces are evacuated, the heating facilities are activated to bond the marginal edge portions of the interlayer to the sheets, thus sealing the periphery of the laminate assembly.

The present invention provides a method of and apparatus for preparing a laminate assembly for autoclaving which is simple, quick, portable, and readily adaptable for use with a variety of shapes and sizes of laminate assemblies. The invention eliminates the need for elaborate support frames and accompanying equipment, requiring instead, only an appropriate channel shaped member, heating blanket, and vacuum supply line. Therefore, production changes to different laminate assembly patterns require only minimal equipment changes and can be accomplished with less interruption in production than was required using prior art devices.

Further, the present invention provides a method and apparatus which results in consistently successful laminate assembly preparation with decreased energy utilization, by applying a greater proportion of a smaller total application of heat to the marginal edge portions of the laminate assembly, rather than applying a larger supply of heat energy to the entire laminate assembly.

DESCRIPTION OF THE DRAWINGS

FIG. 1 is a plan view of a laminate assembly with apparatus attached thereto incorporating features of the present invention for evacuating the interfacial surfaces and sealing the periphery thereof.

FIG. 2 is a longitudinal, sectional view taken along line 2—2 of FIG. 1.

FIG. 3 is an enlarged, transverse, sectional view taken along line 3—3 of FIG. 1.

FIG. 4 is an enlarged plan view of a portion within the circled area of FIG. 1, with portions removed for clarity.

FIG. 5 is an enlarged sectional view of an end portion of an alternate embodiment of the present invention.

DETAILED DESCRIPTION OF THE INVENTION

The present invention provides a method of and apparatus for preparing a laminate assembly 20, e.g. for autoclaving, and is applicable wherever it is desirable to remove interfacial air and subsequently seal marginal edge portions of a laminate assembly, either of a flat or curved configuration. Referring to FIGS. 1, 2 and 3, the laminate assembly 20 generally consists of an upper sheet 22 and a lower sheet 24 having substantially similar size and configuration, and an interlayer 26 of thermoplastic material. Sheets 22 and 24 are preferably rigid sheets with retain their structural integrity when subjected to temperatures in excess of the bubbling temperature of the thermoplastic interlayer. Although not limiting to the invention, sheet materials which may be used include glass, metals, and rigid plastic materials such as polycarbonates, polyesters, polyurethanes, and acrylic plastics such as polymethyl methacrylate. The interlayer 26 is formed with peripheral dimensions matching the peripheral dimensions of sheets 22 and 24, and is conveniently sandwiched therebetween.

The interlayer 26 may be formed of any convenient thermoplastic material, but it is preferred to employ a polyvinyl butyral material with a thickness of about 0.030 inches (0.6 mm), such as taught in U.S. Pat. No. 2,400,957. As used herein, "bonding temperature" is defined as the temperature at which the thermoplastic interlayer 26 becomes soft and readily bonds to the adjacent sheets 22 and 24. "Bubbling temperature" is defined as a temperature above the bonding temperature at which the thermoplastic interlayer 26 forms bubbles within its structure, and "operating range" is defined as the range of temperatures between bonding temperature and bubbling temperature. Although not limiting to the present invention, the bonding temperature of a selected thermoplastic material should exceed the temperature to which a finished laminated assembly will be subjected while in use. Bubbling temperature of the thermoplastic material is dependent upon the moisture content thereof and the amount of vacuum applied thereto, and is preferably considerably higher than the bonding temperature to provide a wide operating range for use in the present invention.

A heating blanket 28 is positioned over the outer major surface of a sheet, e.g. upper sheet 22, conforming with the shape and size thereof, with marginal edge portions 29 of heating blanket 28 adjacent to and overlying marginal edge portions of upper sheet 22. As shown in FIG. 3, the heating blanket 28 preferably has a laminated construction of two layers, the lower layer 27 as mounted consisting of a fluid-impervious, heat resistant, flexible material, e.g. silicone rubber with a thickness about 0.040 inches (1 millimeter (mm)). A protective sheet 38 with peripheral dimensions equal to the peripheral dimensions of lower layer 37 is conveniently bonded thereto to form an upper layer, as mounted, of heating blanket 28. The protective sheet 38 is preferably formed of a material which is flexible enough to conform to the curved shape of a laminate assembly pattern yet rigid enough to resist severe buckling when its marginal edges are heated and restrained from expansively moving. Further, the selected material should be able to withstand repeated heating and cooling without changing structural properties. Materials from which protective sheet 38 may be formed include sheet metals, e.g. stainless steel, galvanized steel, aluminum, and copper, and selected rigid plastics exhibiting the above described properties. As will be appreciated more fully hereafter, the protective sheet 38 is provided to improve the durability of the heating blanket 28, and also to assure more certain engagement with and facilitate the installation of a peripheral evacuation ring 36 with which it cooperates.

As best seen in FIGS. 3 and 4, heating strips 30 are embedded within the marginal edge portions of the lower layer 37 of the heating blanket 28 and are connected by electrical leads 32 to an electrical power supply (not shown). As best illustrated in FIG. 4, the heating strips 30 are connected to electrical leads 32 within a tab 34, positioned inwardly of the marginal edge portion of blanket 28, so as not to interfere with the installation of a channel shaped member in the form of a peripheral evacuation ring 36, to be discussed hereinafter.

The peripheral evacuation ring 36 is engaged about the periphery of an augmented laminate assembly 39 comprising the heating blanket 28 and the laminate assembly 20, as illustrated in FIGS. 1 through 4, with channel arms 40 and 42 of peripheral evacuation ring 36 sealingly engaging outer marginal edge portions of sheet 24 and protective sheet 38 respectively. Peripheral evacuation ring 36 is made of a flexible material which permits the channel arms 40 and 42 to be conveniently spread apart for installation onto the augmented laminate assembly 39, after which channel arms 40 and 42 bias heating blanket 28 toward laminate assembly 20. Channel arms 40 and 42 are preferably about 0.44 inches (11 mm) in length and engage about 0.30 inches (7 mm) of the marginal edge portion of augmented laminate assembly 39, thus forming a conduit 44 about the entire periphery of augmented laminate assembly 39. Peripheral evacuation ring 36 may be constructed according to the teachings of U.S. Pat. No. 2,948,645 to Keim, U.S. Pat. No. 2,992,953 to Talburtt, U.S. Pat. No. 3,100,173 to Boicey et al, or U.S. Pat. No. 3,249,479 to Boicey, which teachings are incorporated herein by reference. Peripheral evacuation ring 36 is conveniently connected by a pipe 45 to a source of vacuum (not shown) by which conduit 44 may be evacuated.

As can now be appreciated, it is important that channel arms 40 and 42 sealingly engage the lower sheet 24 and protective sheet 38 respectively, in order to facilitate the evacuation of conduit 44. Further, it is preferred that the lower layer 37 and protective sheet 38 of heating blanket 28 be continuous surfaces without perforations to assure that ambient atmosphere does not communicate with conduit 44 at the peripheral interfaces of protective sheet 38 and lower layer 37, and at the peripheral interface of lower layer 37 and upper sheet 22.

Channel arm 42, in order to sealingly engage heating blanket 28, must exert sufficient force thereon to exclude ambient atmosphere. Protective sheet 38 provides a surface of engagement which exhibits sufficient durability to allow for repeated engagement and disengagement of peripheral evacuation ring 36 without endangering the certainty of sealing. Further, protective sheet 38 facilitates installation of peripheral evacuation ring 36 by providing a smooth surface over which channel arm 42 can slide, thereby decreasing installation time.

In operation, heating blanket 28 is positioned upon laminate 20 with heating strips 30 overlying with the marginal edge portion of upper sheet 22, after which peripheral evacuation ring 36 is manually installed about the entire periphery of the augmented laminate assembly 39. A vacuum of at least 10 inches (254 mm) of mercury and preferably at least 20 inches (510 mm) of mercury is drawn within conduit 44 in order to remove air and gases entrapped at the interfacial surfaces of sheets 22 and 24 with interlayer 26, to avoid bubbles in the finished product. At the same time, the heating strips 30 are energized and begin to heat up the thermoplastic interlayer 26 to a temperature between the bonding temperature and bubbling temperature, e.g. 150° F. (65° C.) to 250° F. (121° C.), and preferably to about 200° F. (93° C.). Temperatures in excess of the preferred range may result in bubbling of the thermoplastic interlayer 26 which, if slight, may be removed by subsequent autoclaving, but otherwise will result in unsatisfactory peripheral sealing or optical distortion along the marginal edge portions of laminate assembly 20. The process is complete and may be terminated when the marginal edge portions of interlayer 26 are sufficiently bonded to sheets 22 and 24 to seal the periphery of the laminate assembly 20. This condition is detected by visual observation through sheet 24 and is made evident by an optical change in laminate assembly 20 from a cloudy condition to a clear condition where bonding is completed. More complete understanding will be derived from the examples which follow.

EXAMPLE 1

A heating blanket 28 having a lower layer 37 but absent a protective sheet 38 was used to prepare about forty laminate assemblies 20, corresponding to Volkswagen Beetle automobile windshields (NAGS No. FCW-173) for autoclaving. The lower layer 37 was manufactured by Electrofilm, Inc. of Hollywood, Calif. to Applicant's specifications of silicone rubber material about 0.040 inches (1 mm) thick, and had a set of four heating strips 30 embedded about its marginal edges 29 in a band about 0.875 inch (2.2 cm) wide.

Laminate assemblies 20 consisted of sheets 22 and 24 formed of 0.10 inch (0.254 cm) thick glass about a thermoplastic interlayer 26 formed of 0.030 inch (0.8 mm) thick polyvinyl butyral material. The heating blanket 28 was positioned over a major surface of laminate assembly 20 and peripheral evacuation ring 36 was engaged therearound. A vacuum of about 25 inches (635 mm) of mercury was drawn in conduit 44 and maintained, while simultaneously heating strips 30 were energized. To heat and maintain the thermoplastic interlayer 26 to within its operating range of temperature, heating strips 30 were operated at a power rating of about 3 watts per square inch (0.46 watts/cm$^2$). Visual observation through sheet 24 revealed successful peripheral sealing in all laminate assemblies.

It was visually observed during Example 1 that the marginal edge portions of heating blanket 28 expanded as the temperature increased, thus causing a buckling effect at localities about the heating blanket 28 which threatened to interfere with the vacuum in conduit 44. Further, it became evident after repeated usage that channel arm 42 was abrading the upper surface of the marginal edge portion of heating blanket 28 where it was engaged. Time study data gathered during Example 1 revealed that installation time for positioning heating blanket 28 onto laminate assembly 20 and engaging the peripheral evacuation ring 36 therearound was about two minutes per unit. Peripheral sealing was accomplished about 5 minutes after the heating strips 30 were energized, for a total production time of about 7 minutes per laminate assembly.

EXAMPLE 2

A heating blanket 28 having a protective sheet 38 having a smooth upper surface and formed of 0.015 inch (0.38 mm) thick stainless steel bonded to the top surface of lower layer 37 was used to prepare 115 laminate assemblies 20 for autoclaving according to the procedure of Example 1. The laminate assemblies 20 corresponded to Volkswagen Beetle automobile windshields (NAGS No. FCW-173), and a vacuum of about 25 inches (635 mm) of mercury was drawn within conduit 44 while the heating strips 30 were energized to operate at about 3 watts/sq. in. (0.46 watts/cm$^2$). Visual observation through sheet 24 revealed successful peripheral sealing in the laminate assemblies.

It was noted during Example II that installation of the peripheral evacuation ring 36 was facilitated by the smooth upper surface of the protective sheet 38. Time study data revealed that installation time was decreased from Example I to between 1 and 2 minutes. It was also visually observed that the heating blanket 28 evidenced no abrasion about its marginal edge portions from contact with channel arm 42. Further, the expansive buckling effect noted in Example I was appreciably decreased, with a resultant more certain sealing capability. Time study data also revealed that total production time was greater in Example II than Example I, because greater heating time was required to effect successful sealing. It is believed that the protective sheet 38 conducted some heat away from the marginal edge portions of the heating blanket 28, thus requiring more time for the thermoplastic interlayer 26 to reach its operating range of temperature. Total production time was between 8 and 9 minutes per unit in Example II. Despite the increase in production time, it is preferred to use a protective sheet 38 on heating blanket 28 because of the improved durability and decreased buckling tendency when the blanket is thus protected. It will be appreciated by one skilled in the art that use of a protective sheet material with lower heat conductance will mitigate the production time differences observed.

FIG. 5 shows an embodiment of the present invention in which heating blanket 28 and peripheral evacuation ring 36 are secured together to form a unitary element 50. Heating blanket 28 may be secured at its upper marginal edge portions 29 to the inside surface of channel arm 42 in any convenient manner, e.g. with silicone adhesive 52, and the unitary element 50 may then be engaged upon a laminate assembly 20 in a single step to produce a configuration as shown in FIG. 2.

It will be appreciated that the present invention is not limited to the examples and embodiments herein set forth, as variations and modifications are numerous. For example, a pair of heating blankets might be simultaneously disposed on opposite major surfaces of a thick laminate assembly and biased thereto by a peripheral evacuation ring without departing from the scope of the present invention, which is set forth in the claims which follow.

We claim:

1. A method of manufacturing a laminate assembly, said laminate assembly comprising two matched rigid sheets about a thermoplastic interlayer, comprising the steps of:
   positioning heating means over a first exposed major surface of the laminate assembly in alignment with the marginal edge portions thereof;
   forming an evacuatable peripheral conduit about the laminate assembly by sealingly engaging a first channel arm of an endless channel shaped member to marginal portions of said heating means and sealingly engaging an opposing channel arm of the channel shaped member to the opposite exposed major surface of the laminate assembly, the channel arms terminating short of the center portion of the major surfaces of the laminate assembly and biased against the heating means and the opposite exposed major surface with a force sufficient to seal the peripheral conduit when a vacuum is drawn therein;
   drawing a vacuum in the peripheral conduit to evacuate the interfacial surfaces between said sheets and said interlayer; and
   heating the marginal edge portions of the laminate assembly with said heating means to bond the interlayer to the sheets about the marginal edge portions thereof to seal the periphery of the laminate assembly, wherein at least one exposed major surface thereof provides visual access to the effect of the practice of said drawing step and said heating step.

2. The method as set forth in claim 1 further comprising the step of embedding said heating means within a flexible blanket adjacent the marginal edge portions thereof, prior to practicing said positioning step.

3. The method as set forth in claim 1 further comprising the step of heating the marginal edge portions of said thermoplastic interlayer to a temperature above its bonding temperature throughout its length.

4. The method as set forth in claim 3 wherein said temperature is in the range between about 150° F. (65° C.) and 250° F. (121° C.).

5. The method as set forth in claim 1 or 4 wherein said vacuum drawing step is practiced with a vacuum in said peripheral conduit in the range between 10 inches (254 mm.) of mercury and 3 inches (760 mm.) of mercury.

6. The method as set forth in claim 4 wherein said vacuum drawing step is practiced with a vacuum in said peripheral conduit in the range between 20 inches (510 mm.) of mercury and 30 inches (760 mm.) of mercury.

7. The method as set forth in claim 6 further comprising the steps of:
   removing said channel-shaped member and said heating means from said laminate assembly after said periphery of said laminate assembly is sealed; and
   applying heat and pressure to said laminate assembly to bond the interlayer to the sheets about the entirety of the adjacent major surfaces thereof.

8. The method as set forth in claim 7 wherein said heat and pressure applying step is performed within an autoclave.

9. A ready-to-seal laminate system comprising:
   a laminate assembly comprising two matched rigid sheets about a thermoplastic interlayer;
   a blanket covering a major surface of at least one sheet of said laminate assembly with the marginal edges of said blanket overlying the marginal edges of said laminate assembly;
   heating means embedded within the marginal edge portions of said blanket; and
   means for localizing a vacuum at the peripheral interfacial surfaces of said laminate assembly, said vacuum localizing means terminating short of the center portion of the major surfaces of said laminate assembly and including means biasing the marginal edge portions of said blanket toward said laminate assembly.

10. The system as set forth in claim 9 wherein said blanket is fluid impervious.

11. The system as set forth in claim 10 wherein the blanket comprises a first layer and a second layer, said first layer in contact with said laminate assembly and having said heating means embedded therein, and said second layer comprising a thin, flexible protective sheet in contact with said vacuum localizing means.

12. The system as set forth in claim 11 wherein said first layer is formed of silicone rubber and said second layer is formed of stainless steel.

13. The system as set forth in claim 11 wherein said heating means comprises electrically conductive strips occupying a band about one inch (2.54 cm) wide within the marginal edge portion of said first layer.

14. The system as set forth in claim 9 wherein said vacuum localizing means comprises an endless flexible channel-shaped member enclosing the periphery and marginal edge portions of said laminate assembly and said blanket.

15. The system as set forth in claim 9 wherein said blanket is secured to said vacuum localizing means.

16. An apparatus for manufacturing a laminate assembly, said laminate assembly having two matched rigid sheets about a thermoplastic interlayer, comprising:
   means for heating the marginal edge portions of said laminate assembly; and
   a flexible endless channel shaped member, said channel shaped member including a first channel arm sealingly engagable to said heating means and an opposing channel arm sealingly engagable to an exposed major surface of the laminate assembly, the channel arms of the channel shaped member terminating short of the center portion of the major surfaces of the laminate assembly to form an evacuatable peripheral conduit about the laminate assembly, wherein the channel arms are biased against the heating means and the exposed major surface with a force sufficient to seal the peripheral conduit when a vacuum is drawn therein, wherein said exposed major surface provides visual access of the effect of said heating means and a vacuum in said peripheral conduit on said laminate assembly.

17. The apparatus as set forth in claim 16 wherein said heating means comprises a blanket, said blanket being positioned adjacent a major surface of said laminate assembly and having a peripheral heating element embedded therein positioned adjacent the marginal edge portions of said major surface.

18. The apparatus as set forth in claim 17 wherein said blanket is fluid impervious.

19. The apparatus as set forth in claim 17 wherein the blanket comprises a first layer and a second layer, said first layer in contact with said laminate assembly and having said peripheral heating element embedded therein, and said second layer comprising a thin, protective sheet in contact with said biased channel arms.

20. The apparatus as set forth in claim 19 wherein said first layer is formed of silicone rubber and said second layer is formed of stainless steel.

21. The apparatus as set forth in claim 19 wherein said peripheral heating element occupies a band about one inch (2.54 cm) wide about the periphery of said first layer.

22. In a peripheral evacuation ring used in the manufacture of laminated assemblies comprising a unitary endless, fluid impervious, channel shaped member having a pair of opposed channel arms to be engaged about marginal edge portions of a laminate assembly while terminating short of the center portion of the major surfaces of said laminate assembly to form a conduit about the periphery of said laminate assembly to evacuate entrapped air from the interfacial surfaces thereof, the improvement comprising:
   heating means disposed upon at least one of said pair of opposed channel arms to heat said laminate assembly to seal the periphery thereof, wherein at least one exposed major surface of said laminate assembly is provided to allow visual access to the effect of said heating means and of a vacuum in said peripheral conduit upon said laminate assembly.

23. The apparatus as set forth in claim 22 wherein said heating means is an electrically conductive strip biasable towards the marginal edge portions of said laminate assembly by said at least one channel arm when said peripheral evacuation ring is engaged thereon.

24. The apparatus as set forth in claim 22 wherein said heating means is a heating blanket biasable toward a major surface of said laminate assembly by said at least one channel arm when said peripheral evacuation ring is engaged thereon.

25. The apparatus as set forth in claim 24 wherein said heating blanket includes peripheral heating elements embedded therein to heat the marginal edges of said laminate assembly adjacent thereto.

* * * * *